(No Model.) 3 Sheets—Sheet 1.
G. GOWEN.
CORN HARVESTER.
No. 602,216. Patented Apr. 12, 1898.
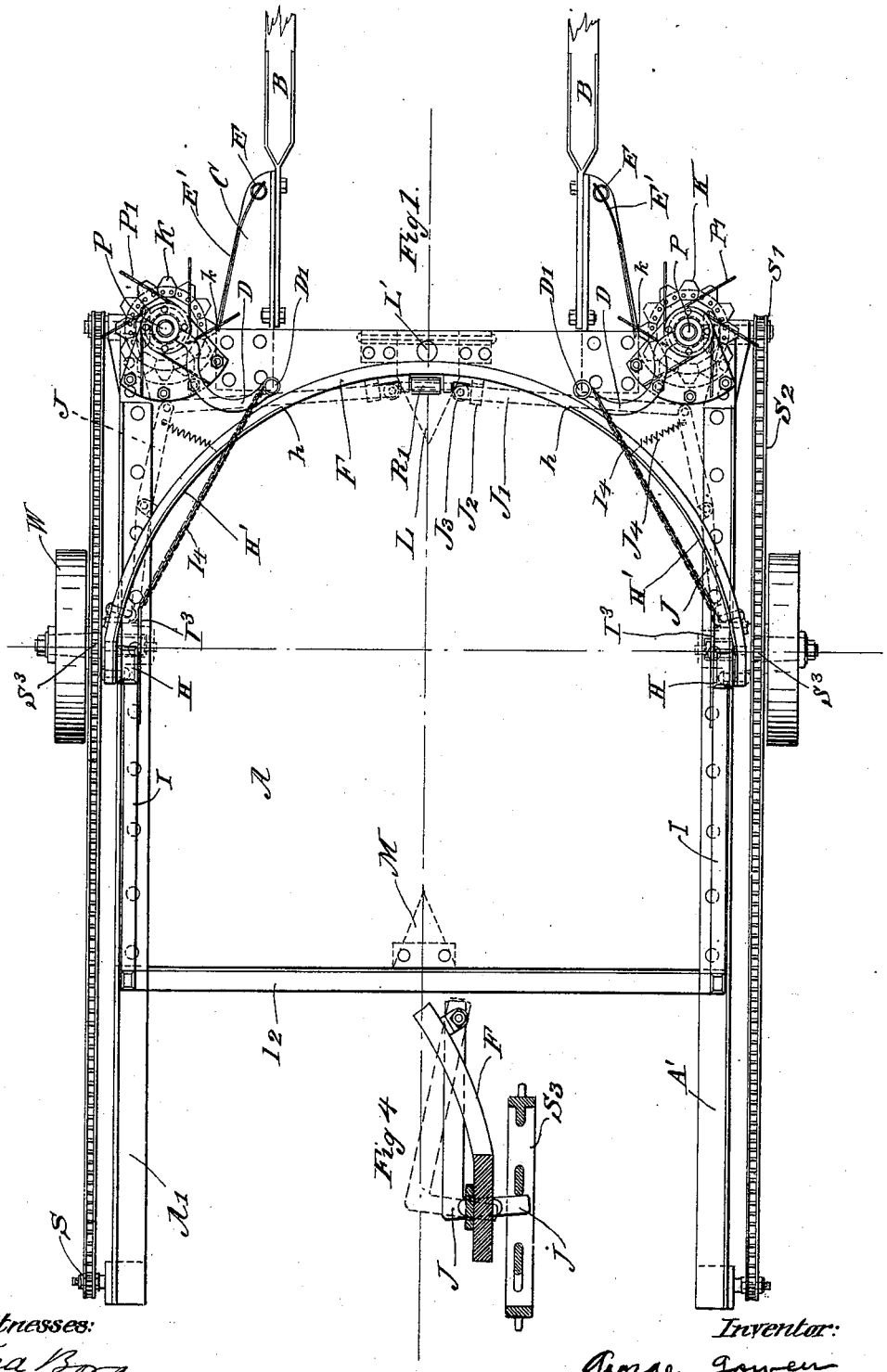
Witnesses:
Fred Borg
L. W. Murphy
Inventor:
George Gowen
By W. E. Williams atty (No Model.) 3 Sheets—Sheet 2.
G. GOWEN.
CORN HARVESTER.
No. 602,216. Patented Apr. 12, 1898.
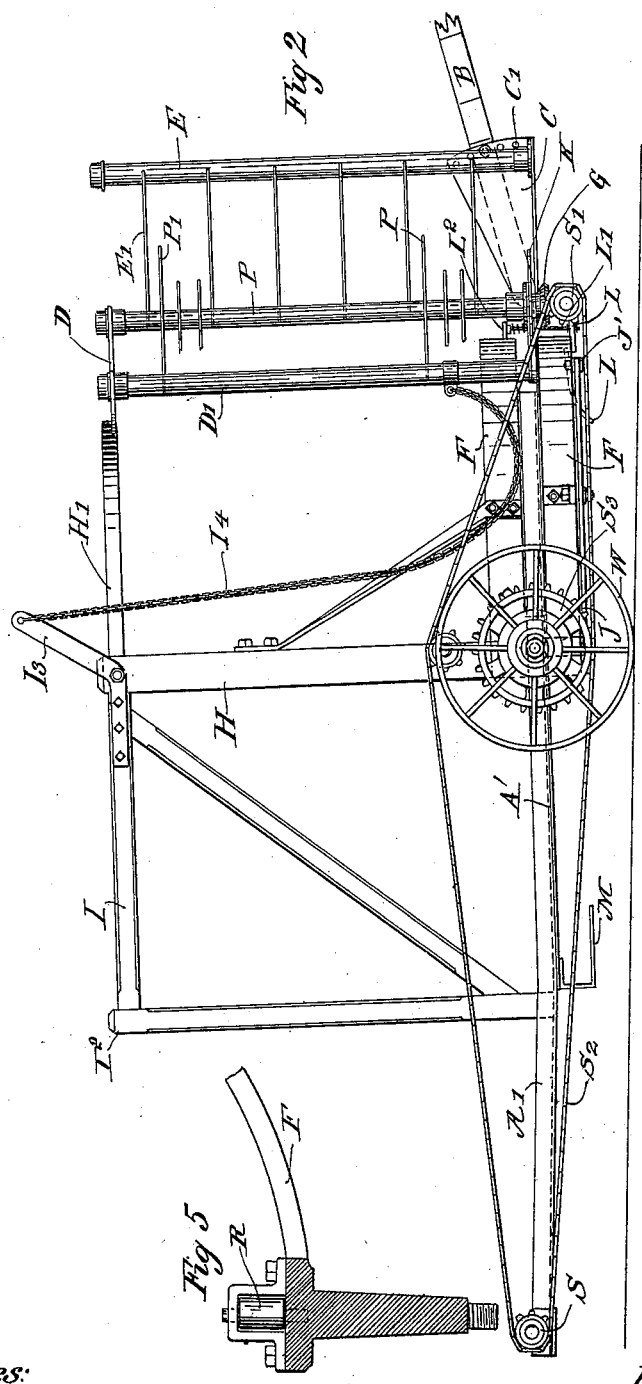
Witnesses:
Fred Borg
L. U. Murphy
Inventor:
George Gowen
By W. E. Williams atty

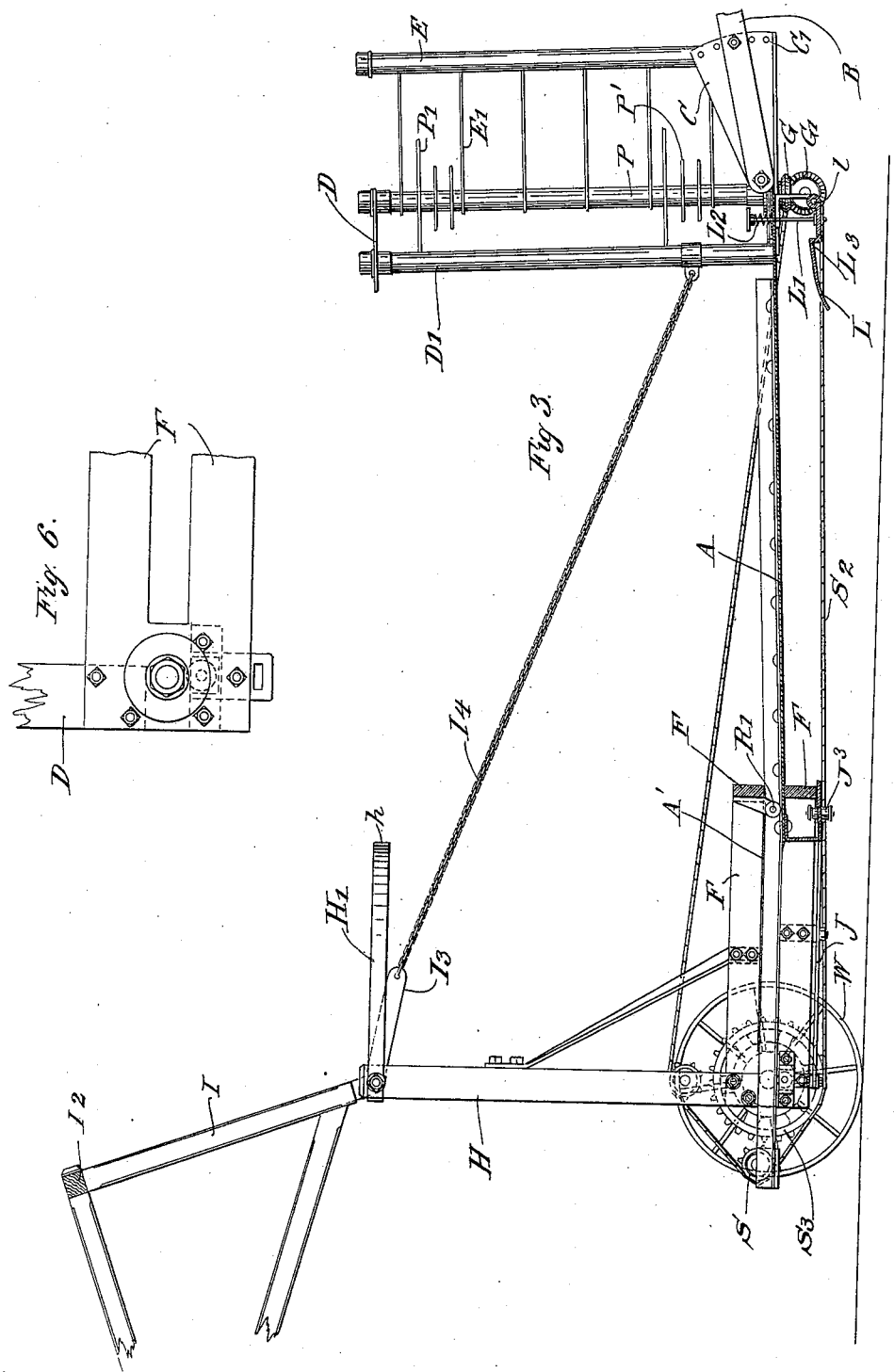

UNITED STATES PATENT OFFICE.

GEORGE GOWEN, OF CHICAGO, ILLINOIS.

CORN-HARVESTER.

SPECIFICATION forming part of Letters Patent No. 602,216, dated April 12, 1898.

Application filed December 24, 1896. Serial No. 616,860. (No model.)

*To all whom it may concern:*

Be it known that I, GEORGE GOWEN, a citizen of the United States, residing at Chicago, in the county of Cook and State of Illinois, have invented a new and useful Improvement in Corn-Harvesters, of which the following is a specification.

The object of my invention is to provide a corn-harvester with which the cornstalks may be cut and assembled upon a platform in an upright position and retained there until a sufficient quantity to make a shock is so assembled, when it is discharged bodily from the platform upon the ground in an upright position; and the invention consists in the devices set forth in the claims hereof.

The machine consists of a platform provided with two rotary cutting and gathering devices and mounted upon two wheels connected by a curved axle supporting a frame which supports the stalks while being assembled upon the platform.

The machine is drawn by one horse walking between two rows of corn, which rows are cut and gathered by the machine, and the thills are attached directly to the platform, and the platform is mounted to slide in its connections with the axle and frame in a manner that the drawing forward of the platform from the axle and the frame strips the stalks from the platform, and at intervals corresponding to the accumulation of a shock upon the platform it is unlocked from the frame and drawn forward, stripping off the stalks, whereupon the horse is stopped and made to back up, pushing the platform back to its normal position with the frame and wheels, when a new shock is then gathered.

Reference will be had to the accompanying drawings, in which—

Figure 1 is a plan view of the machine. Fig. 2 is a side elevation of the machine in its normal position when cutting the corn. Fig. 3 is a side elevation of the machine in the position at the point of completion of the discharge of the shock from the machine. Fig. 4 is a plan sectional view of one of the levers that lock the wheels. Fig. 5 is a plan detail of the axle connection. Fig. 6 is a side view of the axle connection.

In the drawings, A designates the platform. B B are the thills attached to the angle-plates C, which are attached to the platform A and are provided with holes C' for the adjustment of the angle of the thills.

The platform A is made of a flat plate of steel, on the two sides of which are riveted two angle-bars A', extending rearward and supporting the sprocket-wheels S. On the forward corners of the platform are mounted the rotary cutters K, made of sections in a similar manner to the sections of a grain-sickle bar. These rotary cutters lie in contact with the flat surface of the plate A and extend beyond it, as is shown, and the sections cut against small steel plates inlaid in the plate A at the points $k$. The axes of the cutters extend below the plate and are there provided with beveled driving-gears G, which are driven by gears G', driven by a sprocket-wheel S', driven by chains $S^2$, engaging sprocket-wheels $S^3$ on traction-wheels W of the machine. The axes of the cutters extend above the table in the form of the shafts P, and fixed in them are the gathering-fingers P', which revolve with the shafts and serve to carry the stalks around in an upright position, after being cut, into the embrace of the supporting-arms D, which are fixed to the post D', fixed into the platform. The supporting-arms D are connected to the top of shafts P in a manner to steady each other. Fixed to the angles C are posts E, having the spring guiding-fingers E' for guiding the stalks into the embrace of arms D. The bearings of wheels W are fixed to the curved axle-bars F, which are two in number and between which the platform A is mounted. Extending upward from the axle of the wheels are the posts H, which carry the arms H', which end at the points $h$ and serve to retain the stalks on the platform. Pivoted in the tops of posts H is the swinging frame I, having the cross-bar $I^2$ and the arms $I^3$, connected by chains $I^4$ to the posts D'. The purpose of the swinging frame is to support the stalks in an upright position until the time to discharge them, when by the forward movement of the plate and posts D' the chains pull the frame to the position shown in Fig. 3, permitting the stalks to discharge from the platform. To facilitate the movement of the platform in relation to the frame or axles, there are provided the rollers R and R', mounted on the axle and in contact with the plate. On the under side of the axle-bars F are pivoted locking-arms J, connected to the rods J', which are supported at their ends in keepers J², and are provided with rollers J³, engaging a wedge-block L. Springs J⁴ serve at all times to move the rods J' toward the wedge L. The ends of arms J are provided with projections j (see Fig. 4) for engaging the spokes of wheels W. The wedge L is hinged at l to the plate A (see Fig. 3) and is connected to a rod L', passing up through the plate A, which wedge and rod are held up by a spring L². By pushing down rod L' the wedge L is pushed down below the rollers J³, which permits the springs J⁴ to move the arms J to engage the spokes of wheels W and stop their movement. The wedge L also serves to lock the platform normally in position to the frame by shoulder L³ engaging the lower axle-bar F. By pushing down rod L' the wedge L is pushed down below and free of the rollers J³ and below the bar F, releasing the table and locking the wheels, and the further movement of the horse pulls out the table and discharges the shock of corn on the ground, the axle-bars F and arms H' sweeping the stalks from the table, the bar I² being lifted, as before described, and during this forward movement, while the discharge is taking place, the cutters are still driven by the chains, since the wheels W are locked stationary, and the chain moves forward with the table, during which movement the sprockets S³ engage the chains and hold them stationary, while the sprockets S and S' move with the table, and hence drive the cutters while the table is being drawn out to its limit. Just prior to the limit of the forward movement a wedge M, fixed to the under side of the table at the rear end, engages rollers J³, and thereby forces them apart, unlocking the wheels W, which again permits them to move forward beyond the shock of corn just deposited, whereupon the machine is stopped and the horse is backed up, shoving the table home to its normal position, and at that point the wedge L forces apart the rollers J³, unlocking the wheels, and the wedge also, by means of the shoulder L³, locks the frame home.

The operator stands on the front of the platform and removes by hand the stalks as they accumulate in the embrace of the arms D and sets them up on the platform against the cross-bar I² of the frame I, and when a sufficient quantity of stalks is gathered on the platform the operator ties them in a bundle and then pushes down the rod L', and thereby releases the platform and locks the wheels, as before described, and the further movement of the horse draws forward the platform, as before described, which removes the stalks from the platform, the operator steadying them to rest upon the ground.

What I claim is—

1. The combination of a platform on which the stalks are carried as gathered; of draft devices attached to the platform; with a frame mounted upon traction-wheels, and said platform movable in relation to the frame; said frame provided with means for supporting the stalks on the platform in an upright position and for stripping the stalks from the platform, means for locking and unlocking the frame to and from the platform, and means for locking and unlocking the wheels for the purpose described.

2. The combination of a supporting-platform for the stalks, of draft devices attached to the platform with a frame, in relation to which the platform is movable, provided with means for supporting the stalks upon the platform and for stripping them from the platform, means for locking and unlocking the platform to and from the frame, and means for locking and unlocking the frame in a fixed position in relation to the ground during the stripping of the stalks from the platform, for the purpose described.

3. The combination of the platform for supporting and carrying the stalks, of draft devices attached thereto, and of devices attached to the platform for cutting the stalks, of devices fixed to the platform for supporting the stalks in an upright position during the cutting; with a frame for supporting the platform mounted upon traction-wheels in a manner that the platform is movable in relation thereto, and said frame carrying devices for supporting the stalks while being gathered, and for removing the stalks when gathered, substantially as shown.

4. The combination of the platform mounted upon a frame, and adapted to slide in relation thereto, said frame consisting of the curved axle-bars F, one of them curving forward over the surface of the platform, and posts H fixed to the axle-frame, and the tilting-frame bar I² pivoted to said posts with means for moving the platform in relation to the frame whereby the frame strips the stalks from the platform, in the manner shown and for the purpose described.

5. The combination of the platform for supporting the stalks while being gathered, of devices mounted upon the platform for cutting the stalks, of draft devices attached to the platform; with a framework suitably mounted upon traction-wheels, said platform sliding in relation to the said framework, means for locking the said framework in a position relative to that of the platform, and means for locking the traction-wheels of the frame simultaneously with the unlocking of the framework and platform, with a tilting frame fixed to the traction-wheel frame and moved therewith for supporting the stalks in an upright position on the platform while being gathered, means connected to the platform whereby by the movement of the platform in relation to the axle-frame the tilting frame is tilted clear of the stalks upon the platform permitting them to be discharged in an upright position, substantially as shown and described.

6. The combination of the platform A, of draft devices attached thereto, of devices mounted on said platform for cutting the stalks, with a traction-wheel frame mounted in a manner that the platform may slide in relation to the frame, and comprising the curved axle-bars F, and the levers J pivoted to the axle-frame in the manner shown, provided with projections for engaging the traction-wheels arresting their motion in the manner shown and for the purpose described.

7. The combination of the platform A, having the draft devices thereto attached, provided with rearwardly-extending arms A', with a traction-wheel frame mounted in a manner that the platform may slide in relation thereto, said frame having a curved bar F crossing the top surface of the platform, in the manner shown, said platform adapted to slide forwardly in relation to the frame and be supported in its forward position by the extending arm A' whereby the curved arm F is permitted to sweep the entire surface of the platform in order to free the stalks entirely therefrom, in the manner shown and for the purpose described.

In witness whereof I have hereunto subscribed my name, on this 22d day of December, 1896, in the presence of two subscribing witnesses.

GEO. GOWEN.

Witnesses:
W. E. WILLIAMS,
FRED BORG.